United States Patent
Baumann et al.

(10) Patent No.: US 11,808,226 B2
(45) Date of Patent: Nov. 7, 2023

(54) METHOD, PROCESSING UNIT, AND COMPUTER PROGRAM FOR OPERATING AN EXHAUST GAS SYSTEM

(71) Applicant: Robert Bosch GmbH, Stuttgart (DE)

(72) Inventors: Alexander Baumann, Ostercappeln-Venne (DE); Frank Meier, Stuttgart (DE); Jan Kappa, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/960,366

(22) Filed: Oct. 5, 2022

(65) Prior Publication Data

US 2023/0106310 A1    Apr. 6, 2023

(30) Foreign Application Priority Data

Oct. 6, 2021 (DE) .......................... 102021211247.1

(51) Int. Cl.
*F02D 41/02* (2006.01)
*F02D 41/14* (2006.01)

(52) U.S. Cl.
CPC ..... *F02D 41/0295* (2013.01); *F02D 41/1454* (2013.01); *F02D 41/1475* (2013.01); *F02D 2200/0814* (2013.01)

(58) Field of Classification Search
CPC ............. F02D 41/0295; F02D 41/1454; F02D 41/1475; F02D 2200/0814; F01N 13/009;
(Continued)

(56) References Cited

U.S. PATENT DOCUMENTS 7,431,895 B2 * 10/2008 Pfeifer ................ F01N 13/0097
422/177
9,518,287 B2 * 12/2016 Theis ................... F02D 41/0087
(Continued)

FOREIGN PATENT DOCUMENTS

DE    102016222418 A1    5/2018
DE    102018208683 A1    12/2019
(Continued)

OTHER PUBLICATIONS

Machine translation JP 2018-003777 (Year: 2023).*

*Primary Examiner* — Mickey H France
*Assistant Examiner* — Dapinder Singh
(74) *Attorney, Agent, or Firm* — Michael Best & Friedrich LLP

(57) ABSTRACT

A method (200) for operating an exhaust gas system (120) that includes a first catalytic converter (122) and at least one second catalytic converter (124), which are both arranged downstream from an internal combustion engine (110) The internal combustion engine (110) is controlled to generate a rich exhaust gas having a first rich gas portion, (220) a fill level of the second catalytic converter (124) is ascertained with respect to at least one lean gas component that is storable in the second catalytic converter and, if the ascertained fill level drops below (230) a minimum fill level, (240) the internal combustion engine (110) is controlled to generate a lean exhaust gas. The internal combustion engine (110) is then controlled to generate a rich exhaust gas having a second rich gas portion, and subsequently controlled (210) to generate the rich exhaust gas having the first rich gas portion.

11 Claims, 2 Drawing Sheets

(58) Field of Classification Search
CPC .......... F01N 11/00; F01N 11/007; F01N 9/00; F01N 3/106; F01N 3/103; F01N 3/0871; F01N 3/2066; F01N 3/035; F01N 3/208; F01N 3/0842; F01N 3/0814; F01N 3/021; F01N 3/101; F01N 3/0253; F01N 3/0821; F01N 3/0885; F01N 2430/06; F01N 2900/1402; F01N 2900/08; F01N 2550/02; F01N 2560/025; F01N 2250/02; Y02T 10/12; Y02T 10/40
See application file for complete search history.

(56) References Cited

U.S. PATENT DOCUMENTS

| | | |
|---|---|---|
| 2002/0038544 A1 | 4/2002 | Ikemoto et al. |
| 2004/0006971 A1 | 1/2004 | Kamoto et al. |
| 2015/0027107 A1* | 1/2015 | Theis .................. C12Q 1/6806 60/274 |

FOREIGN PATENT DOCUMENTS

| | | |
|---|---|---|
| DE | 102018217307 A1 | 4/2020 |
| JP | 2018003777 A | 1/2018 |

* cited by examiner

METHOD, PROCESSING UNIT, AND COMPUTER PROGRAM FOR OPERATING AN EXHAUST GAS SYSTEM

BACKGROUND OF THE INVENTION

The present invention relates to a method for operating an exhaust gas system and to a processing unit and a computer program for carrying out the method.

In an incomplete combustion of the air-fuel mixture in a spark-ignition engine, not only are nitrogen ($N_2$), carbon dioxide ($CO_2$), and water ($H_2O$) emitted, but a plurality of products of combustion is emitted as well, of which hydrocarbons (HC), carbon monoxide (CO), and nitrogen oxides ($NO_x$) are limited by law. The applicable exhaust gas limiting values for motor vehicles can typically be observed only with a catalytic exhaust gas aftertreatment. The aforementioned pollutant components can be converted due to the use of a three-way catalytic converter.

A simultaneously high conversion rate for HC, CO, and $NO_x$ is achieved with three-way catalytic converters only in a narrow range around the stoichiometric operating point (lambda=1), the so-called "catalyst window."

A lambda control, which is based on the signals of lambda sensors upstream and downstream from the catalytic converter, is typically used to operate the catalytic converter in the catalyst window. For the closed-loop control of the lambda value upstream from the catalytic converter, the oxygen content of the exhaust gas is measured upstream from the catalytic converter using a lambda sensor. Depending on this measured value, the closed-loop control corrects the amount of fuel from the mixture precontrol. For a more precise closed-loop control, the exhaust gas is additionally analyzed downstream from the catalytic converter using another lambda sensor. This signal is used for a trim control, which is superimposed on the lambda control upstream from the catalytic converter. A switching-type lambda sensor is generally used as the lambda sensor downstream from the catalytic converter, which switching-type lambda sensor has a very steep characteristic curve at lambda=1 and, therefore, can highly precisely display lambda=1.

In addition to the trim control, which generally corrects only small deviations from lambda=1 and is designed to be comparatively slow, a lambda precontrol can be used after large deviations from lambda=1 to quickly reach the catalyst window again, for example, after phases with overrun fuel cut-off ("catalytic converter purging").

Such control concepts have the disadvantage that they are late in detecting that the catalyst window has been exited on the basis of the voltage of the switching-type lambda sensor downstream from the catalytic converter.

An alternative to the closed-loop control of the three-way catalytic converter on the basis of the signal of a lambda sensor downstream from the catalytic converter is a closed-loop control of the mean oxygen fill level of the catalytic converter. Since this mean fill level is not measurable, it can only be modeled. An appropriate model-based closed-loop control of the fill level of a three-way catalytic converter is described in DE 10 2016 222 418 A1. A precontrol for a model-based closed-loop control of the fill level of a three-way catalytic converter is described in DE 10 2018 208 683 A1, a model-based prediction of the precontrol lambda value necessary during the restart after a phase with an inactive control action is described in DE 10 2018 217 307 A1.

SUMMARY OF THE INVENTION

According to the invention, a method for operating an exhaust gas system and a processing unit and a computer program for carrying out the method.

A method according to the invention for operating an exhaust gas system that includes a first catalytic converter and at least one second catalytic converter, which is arranged downstream from the first catalytic converter, wherein the exhaust gas system is arranged downstream from an internal combustion engine, includes controlling the internal combustion engine to generate a rich exhaust gas having a first rich gas portion, ascertaining a fill level of the second catalytic converter (remote from the engine) with respect to at least one lean gas component that is storable in the second catalytic converter and, if the ascertained fill level drops below a predeterminable minimum fill level, controlling the internal combustion engine to generate a lean exhaust gas, subsequently controlling the internal combustion engine to generate a rich exhaust gas having a second rich gas portion, which is higher than the first rich gas portion, and subsequently controlling the internal combustion engine to generate the rich exhaust gas having the first rich gas portion. Overall, this permits a (possibly also only slightly) rich operation of the first catalytic converter (close to the engine) and a lean operation of the second catalytic converter (remote from the engine), so that the first catalytic converter converts nitrogen oxides with carbon monoxide and hydrocarbons, which are subjected to particularly strict rules, and the second catalytic converter may convert remaining rich gas components, such as carbon monoxide and hydrocarbons and, in particular, ammonia, which can be formed in the first catalytic converter.

The control of the internal combustion engine to produce the lean exhaust gas is preferably carried out for as long as it takes for the ascertained fill level of the second catalytic converter to exceed an operating threshold of the second catalytic converter, which is higher than the minimum fill level. In this way, the fill level can be set high again such that an operating phase that is as long as possible without regeneration is enabled.

The control of the internal combustion engine to generate the rich exhaust gas having the second rich gas content is advantageously carried out for as long as it takes for a fill level of the first catalytic converter to fall below an operating threshold of the first catalytic converter with respect to a lean gas component that is storable in the first catalytic converter. In this way, a storage capacity for lean gas components that is as high as possible is also made available in the first catalytic converter, which maximizes a possible period of operation without intermediate regeneration.

The first rich gas portion is preferably dimensioned in such a way that the exhaust gas has a lambda value in a range from 0.99 to 0.999, preferably in a range from 0.995 to 0.999. This has proven to be a particularly advantageous parameter range.

The control of the internal combustion engine to generate a lean exhaust gas as a function of a current operating state of the internal combustion engine is carried out, in particular, by requesting a coasting operation phase and/or via substoichiometric fuel metering, wherein the request for a coasting operation phase preferably takes place for the case in which the current operating state includes providing a torque that is lower than a predeterminable threshold value, and/or the substoichiometric fuel metering preferably takes place for the case in which the current operating state includes providing a torque that is greater than the threshold value. As a result, the controllability of the internal combustion engine can be positively affected and taken into account.

The minimum fill level can be, in particular, greater than 5%, 10%, or 20% of a storage capacity of the second catalytic converter. As a result, a reserve can still be provided, which can reliably prevent a breakthrough of rich exhaust gas by the second catalytic converter.

The operating threshold of the second catalytic converter is advantageously selected from a range from 50% to 100%, in particular from 80% to 100%, of a maximum capacity of the second catalytic converter with respect to lean gas components, in order to enable an operating phase that is as long as possible without regeneration of the catalytic converter.

The operating threshold of the first catalytic converter is selected, in particular, from a range between 0% and 50%, in particular between 0% and 25%, of a maximum storage capacity of the first catalytic converter with respect to the lean gas component. As a result, a breakthrough of lean exhaust gas by the first catalytic converter can be prevented in a normal operating mode (i.e., in particular outside a regeneration operation).

A processing unit according to the invention, for example, a control unit of a motor vehicle, is configured, in particular via programming, to carry out a method according to the invention.

The implementation of a method according to the invention in the form of a computer program or a computer program product having program code for carrying out all method steps is also advantageous, since this generates particularly low costs, in particular when an executing control unit is also used for further tasks and is therefore present anyway. Finally, a machine-readable memory medium is provided, which has a computer program stored thereon as described above. Suitable memory media and data carriers for providing the computer program are, in particular, magnetic, optical, and electrical memories, such as, for example, hard drives, flash memories, EEPROMs, DVDs, and many others. It is also possible to download a program via computer networks (Internet, intranet, etc.). Such a download can take place in a manner that is hard-wired or wireless (for example, via a WLAN network, a 3G, 4G, 5G or 6G connection, etc.).

BRIEF DESCRIPTION OF THE DRAWINGS

Further advantages and embodiments of the invention result from the description and the attached drawings.

The invention is schematically represented in the drawings on the basis of an exemplary embodiment and is described in the following with reference to the drawings.

DETAILED DESCRIPTION

Figure 1:
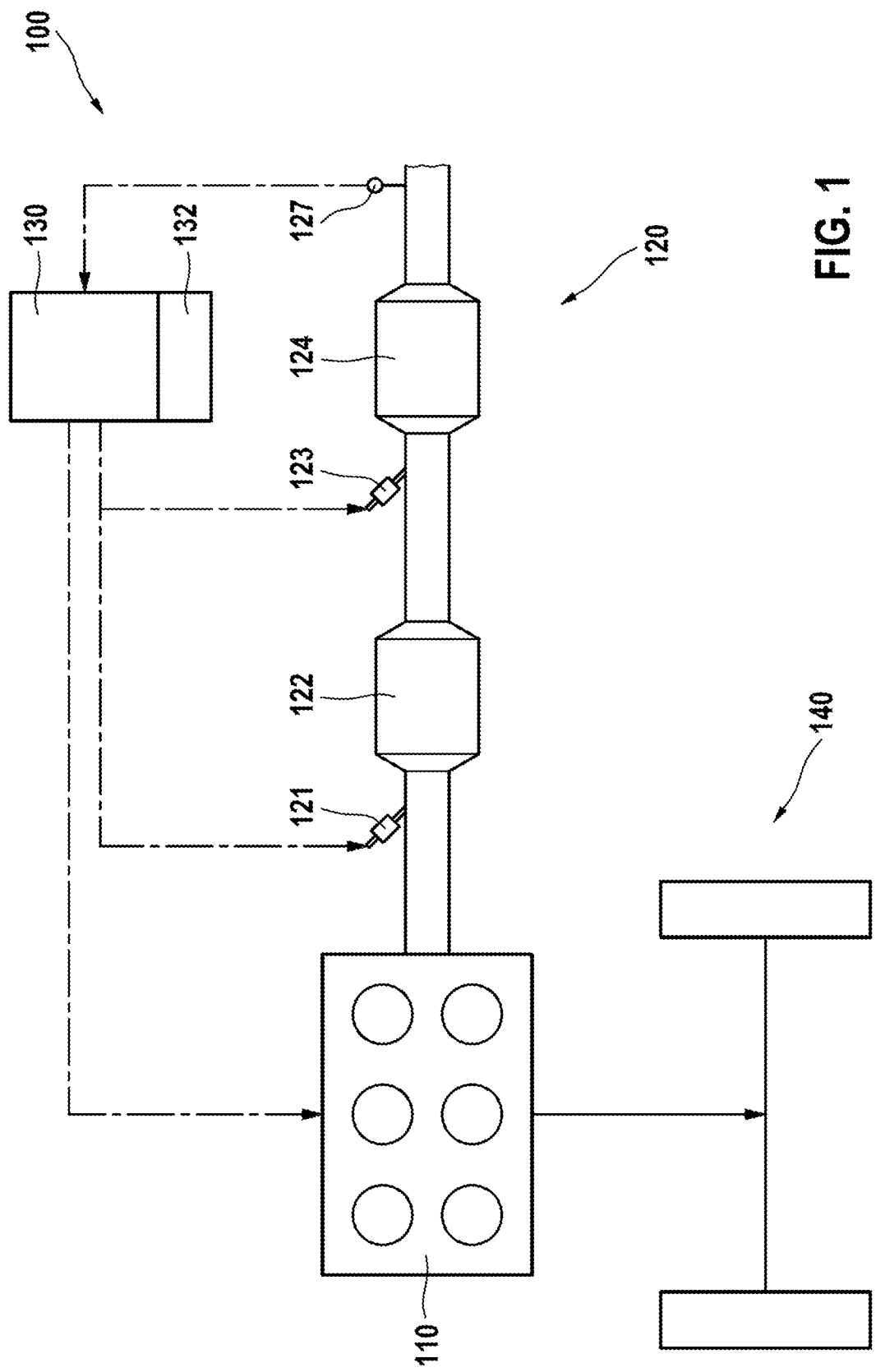
FIG. 1 schematically shows a vehicle that includes an internal combustion engine and a catalytic converter of the type which can be used within the scope of the present invention.

In FIG. 1, a vehicle of the type which can be utilized within the scope of the invention is schematically represented and designated overall with 100. The vehicle 100 includes an internal combustion engine 110, which has, for example, six indicated cylinders in this case, an exhaust gas system 120, which includes a first catalytic converter 122 and a second catalytic converter 124, and a processing unit 130, which is configured for controlling the internal combustion engine 110 and the exhaust gas system 120 and is data-conductively connected to the internal combustion engine 110 and the exhaust gas system 120. Moreover, the processing unit 130 in the represented example is data-conductively connected to sensors 121, 123, 127, which gather operating parameters of the internal combustion engine 110 and/or of the exhaust gas system 120. It is understood that further sensors, which are not represented, can be present. The exhaust gas system 120 can possibly also include further cleaning components, such as, for example, particulate filters and/or further catalytic converters, which are not represented here, however, for the sake of simplicity.

In the example represented here, the processing unit 130 includes a data memory 132, in which, for example, calculation specifications and/or parameters (for example, threshold values, characteristics of the internal combustion engine 110 and/or of the exhaust gas system 120, or the like) can be stored.

The internal combustion engine 110 drives wheels 140 and can also be driven by the wheels in certain operating phases (for example, the so-called coasting operation).

Figure 2:
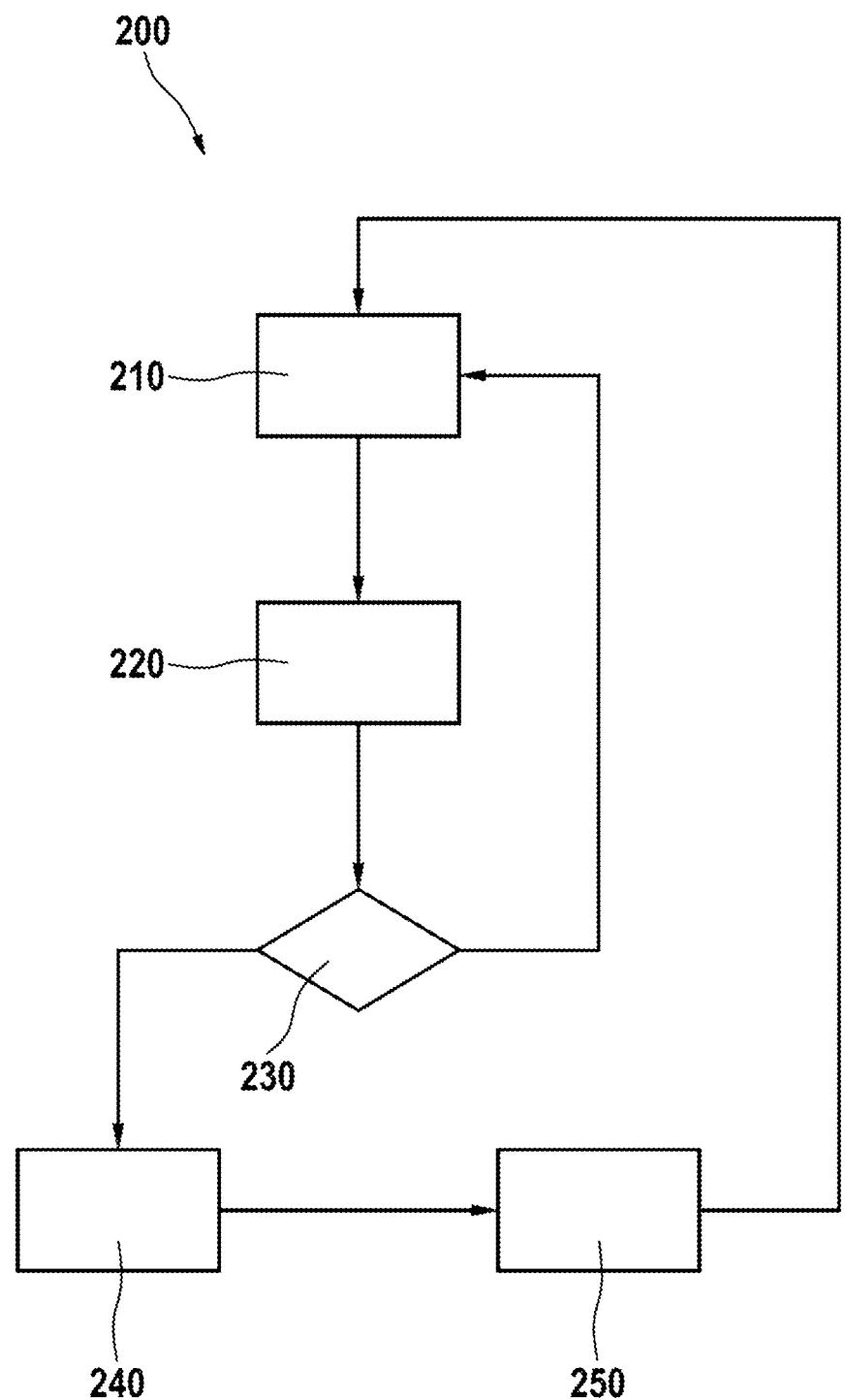
FIG. 2 shows an advantageous embodiment of the invention in the form of a highly simplified flow chart.

In FIG. 2, an advantageous embodiment of the invention is schematically represented using the example of a method in the form of a flow chart and is designated overall with 200.

References to components of a vehicle or of a part of a vehicle used in the description of the method 200 relate, in particular, to the vehicle 100 represented in FIG. 1.

The method 200 is represented in steps in the following, in order to enable a better understanding of the invention. This is not to be understood, however, to mean that the invention is limited to a step by step execution of the method 200. Rather, individual steps can also be carried out simultaneously or in another, for example, reverse, order, unless expressly indicated otherwise. An essentially continuous execution of many of the described steps may also be advantageous.

In the example represented in FIG. 2, the method 200 starts with a first step 210 in which the internal combustion engine 110 is controlled to generate a rich exhaust gas having a first rich gas portion. For this purpose, for example, suitable control signals are sent from the control unit 130 to the internal combustion engine, in particular, to a fuel injection system and/or a throttle position (not separately represented). For example, the exhaust gas having the first rich gas portion can have a lambda value in a range from 0.99 to 0.999, for example, a lambda value of 0.998.

In a step 220, a fill level of the second catalytic converter 124 is ascertained with respect to at least one lean gas component, in particular oxygen. For this purpose, in particular, a fill level model, the parameter of the second catalytic converter 124, and input variables, for example, lambda values upstream and/or downstream from the catalytic converter, the operating point of the internal combustion engine, an exhaust gas mass flow rate, and the like can be taken into account. Reference is made again to the aforementioned literature with respect to the specific embodiment of a fill level model of this type.

In a step 230, the ascertained fill level is compared to a minimum fill level. If the ascertained fill level of the second catalytic converter 124 is greater than the minimum fill level, which can be, for example, 5% with respect to a maximally storable amount of the lean gas component, the method 200 returns to the step 210.

If it is established in the step 230, however, that the minimum fill level has been fallen below, the method 200 continues with a step 240 in which the internal combustion engine 110 is controlled to generate a lean exhaust gas. For this purpose, for example, a coasting phase is requested by the control unit 130. In particular, a current operating state of the internal combustion engine 110 can be taken into account. For example, a coasting request can be output for the case in which the internal combustion engine 110 is instantaneously in an operating state of the fired coasting (for example, within the scope of a catalytic converter heat-up measure) or in a phase having a low load. In order to avoid a noticeable change in torque, in particular, the internal combustion engine 110 can be briefly separated from the wheels 140 during the coasting operation phase. If the fill level of the second catalytic converter 124 has risen by means of the lean operation 240 to such an extent that an operating threshold of the second catalytic converter 124 has been exceeded (for example, 90% fill level), the method 200 continues with a step 250.

In the step 250, the first catalytic converter 122 is switched into its target operating state again. As explained at the outset, the first catalytic converter 122 is operated slightly rich, so that its fill level with respect to lean gas components, which is close to 100% after the lean operation phase 240, must be lowered again, in order to bring the catalytic converter into the catalyst window (=catalytic converter purging). For this purpose, the control unit 130 controls the internal combustion engine 110 to generate a rich exhaust gas having a second rich gas portion, which is higher than the aforementioned first rich gas portion. For example, a lambda value of the rich exhaust gas having the second rich gas portion can be in a range between 0.7 and 0.9, for example, at 0.85. As a result, the first catalytic converter can be quickly switched to an operational state again. If the fill level of the first catalytic converter 122 drops below an operating threshold of the first catalytic converter 122 (for example, fill level<25%), the method 200 returns to the step 210 in which the rich exhaust gas having the first rich gas portion is generated again.

It is understood that the method 200 does not necessarily need to be or can be carried out without interruption during the entire period of operation of the internal combustion engine 110. For example, it can be necessary to carry out a heating program for the exhaust gas system 120 at the beginning of an operating phase of the internal combustion engine 110, the heating program possibly placing different requirements on the exhaust gas composition than the present method 200. Accordingly, the method 200 explained here can also be carried out in combination or in alternation with other operating modes without deviating from the concept underlying the invention.

The invention claimed is:

1. A method (200) for operating an exhaust gas system (120) including a first catalytic converter (122) and at least one second catalytic converter (124), which is arranged downstream from the first catalytic converter (122), wherein the exhaust gas system (120) is arranged downstream from an internal combustion engine (110), the method comprising:
controlling (210) the internal combustion engine (110) to generate a rich exhaust gas having a first rich gas portion,
ascertaining (220) a fill level of the second catalytic converter (124) with respect to at least one lean gas component that is storable in the second catalytic converter and, if the ascertained fill level drops below (230) a minimum fill level,
controlling (240) the internal combustion engine (110) to generate a lean exhaust gas,
subsequently controlling (250) the internal combustion engine (110) to generate a rich exhaust gas having a second rich gas portion, which is higher than the first rich gas portion, and
subsequently controlling (210) the internal combustion engine (110) to generate the rich exhaust gas having the first rich gas portion,
wherein the minimum fill level is less than a maximum storage capacity of the second catalytic converter (124).

2. The method (200) according to claim 1, wherein the control (240) of the internal combustion engine (110) to produce the lean exhaust gas is carried out for as long as it takes for the ascertained fill level (220) of the second catalytic converter (124) to exceed an operating threshold of the second catalytic converter (124), which is higher than the minimum fill level.

3. The method (200) according to claim 2, wherein the operating threshold of the second catalytic converter (124) is taken from a range from 50% to 100% of a maximum capacity of the second catalytic converter (124) with respect to lean gas components.

4. The method (200) according to claim 1, wherein the control (250) of the internal combustion engine (110) to generate the rich exhaust gas having the second rich gas content is advantageously carried out for as long as it takes for a fill level of the first catalytic converter (122) to fall below an operating threshold of the first catalytic converter (122) with respect to a lean gas component that is storable in the first catalytic converter.

5. The method (200) according to claim 4, wherein the operating threshold of the first catalytic converter (122) is selected from a range between 0% and 25% of a maximum storage capacity of the first catalytic converter with respect to the lean gas component.

6. The method (200) according to claim 1, wherein the first rich gas portion is dimensioned in such a way that the exhaust gas has a lambda value in a range from 0.99 to 0.999.

7. The method (200) according to claim 1, wherein the control (240) of the internal combustion engine (110) to generate a lean exhaust gas as a function of a current operating state of the internal combustion engine (110) is carried out by requesting a coasting operation phase and/or via substoichiometric fuel metering.

8. The method (200) according to claim 7, wherein the request for a coasting operation phase takes place when the current operating state includes providing a torque that is lower than a predeterminable threshold value, and/or the substoichiometric fuel metering preferably takes place when the current operating state includes providing a torque that is greater than the threshold value.

9. The method (200) according to claim 1, wherein the minimum fill level is greater than 5%, 10%, or 20% of a storage capacity of the second catalytic converter (124).

10. An electronic controller including a processor (130), the electronic controller configured to
operate an exhaust gas system (120) including a first catalytic converter (122) and at least one second catalytic converter (124), which is arranged downstream from the first catalytic converter (122), wherein the exhaust gas system (120) is arranged downstream from an internal combustion engine (110), by:
controlling (210) the internal combustion engine (110) to generate a rich exhaust gas having a first rich gas portion, ascertaining (220) a fill level of the second catalytic converter (124) with respect to at least one lean gas component that is storable in the second catalytic converter and, if the ascertained fill level drops below (230) a minimum fill level, controlling (240) the internal combustion engine (110) to generate a lean exhaust gas, subsequently controlling (250) the internal combustion engine (110) to generate a rich exhaust gas having a second rich gas portion, which is higher than the first rich gas portion, and subsequently controlling (210) the internal combustion engine (110) to generate the rich exhaust gas having the first rich gas portion, wherein the minimum fill level is less than a maximum storage capacity of the second catalytic converter (124).

11. A non-transitory, computer-readable medium (132) containing instructions that when executed by a computer cause the computer to operate an exhaust gas system (120) including a first catalytic converter (122) and at least one second catalytic converter (124), which is arranged downstream from the first catalytic converter (122), wherein the exhaust gas system (120) is arranged downstream from an internal combustion engine (110), by:

controlling (210) the internal combustion engine (110) to generate a rich exhaust gas having a first rich gas portion, ascertaining (220) a fill level of the second catalytic converter (124) with respect to at least one lean gas component that is storable in the second catalytic converter and, if the ascertained fill level drops below (230) a minimum fill level, controlling (240) the internal combustion engine (110) to generate a lean exhaust gas, subsequently controlling (250) the internal combustion engine (110) to generate a rich exhaust gas having a second rich gas portion, which is higher than the first rich gas portion, and subsequently controlling (210) the internal combustion engine (110) to generate the rich exhaust gas having the first rich gas portion, wherein the minimum fill level is less than a maximum storage capacity of the second catalytic converter (124).

\* \* \* \* \*